United States Patent
Chen

(10) Patent No.: US 8,762,220 B2
(45) Date of Patent: Jun. 24, 2014

(54) METHOD AND SYSTEM FOR NETWORK TRANSACTION

(76) Inventor: Chen-Hung Chen, Taipei (TW)

( * ) Notice: Subject to any disclaimer, the term of this patent is extended or adjusted under 35 U.S.C. 154(b) by 467 days.

(21) Appl. No.: 13/197,347

(22) Filed: Aug. 3, 2011

(65) Prior Publication Data

US 2012/0284103 A1 Nov. 8, 2012

(30) Foreign Application Priority Data

May 6, 2011 (TW) .............................. 100115947 A

(51) Int. Cl.
*G06Q 30/00* (2012.01)
*G06Q 30/06* (2012.01)
*G06Q 30/02* (2012.01)

(52) U.S. Cl.
CPC ............ *G06Q 30/06* (2013.01); *G06Q 30/0641* (2013.01); *G06Q 30/0222* (2013.01); *G06Q 30/0605* (2013.01)
USPC ....................... 705/26.2; 705/14.23; 705/27.1

(58) Field of Classification Search
CPC .......... G06Q 30/0605; G06Q 30/0641; G06Q 30/0222; G06Q 50/01
USPC ........................... 705/14.23, 26.62, 27.1, 26.2
See application file for complete search history.

(56) References Cited

U.S. PATENT DOCUMENTS

| | | | |
|---|---|---|---|
| 6,631,356 B1 * | 10/2003 | Van Horn et al. ............ | 705/26.2 |
| 7,349,879 B2 * | 3/2008 | Alsberg et al. ................. | 705/37 |
| 7,480,627 B1 * | 1/2009 | Van Horn et al. ............ | 705/26.2 |
| 7,970,661 B1 * | 6/2011 | Abraham et al. ............ | 705/26.1 |
| 8,140,402 B1 * | 3/2012 | Mesaros ...................... | 705/26.1 |
| 8,290,824 B1 * | 10/2012 | Mesaros ...................... | 705/26.2 |
| 2001/0032162 A1 * | 10/2001 | Alsberg et al. ................. | 705/37 |
| 2005/0125333 A1 * | 6/2005 | Giannetti ....................... | 705/37 |
| 2006/0047583 A1 * | 3/2006 | Jacobs .......................... | 705/27 |
| 2008/0177641 A1 * | 7/2008 | Herniak et al. ................ | 705/27 |
| 2010/0318435 A1 * | 12/2010 | Ramanathan et al. ......... | 705/26 |
| 2011/0016014 A1 * | 1/2011 | Tonnison et al. ............ | 705/26.2 |
| 2011/0178889 A1 * | 7/2011 | Abraham et al. ............ | 705/26.1 |

OTHER PUBLICATIONS

Welch, M., "Santa's Helper," Boston Globe, Dec. 25, 1997, Third Edition, Business Section, p. E4.*
Anon., "Thailand: Property Developers and Automotive Companies Jump on Bandwagon of Social Commerce," Thai Press Reports, Jan. 17, 2011.*

* cited by examiner

*Primary Examiner* — Nicholas D Rosen
(74) *Attorney, Agent, or Firm* — Morris, Manning & Marting, LLP; Tim Tingkang Xia, Esq.

(57) ABSTRACT

A network transaction method is for consumers and users to trade a product via the internet. The network transaction method provides a must-buy or first-to-buy transaction mode and includes the steps of exhibiting product information to allow one of the consumers to select the product; generating a transaction webpage and a sign-in webpage according to the selected product to trade, and the sign-in webpage being provided for the users to sign in directly or push a post to recommend other users to sign in; using the sign-in action to change a transaction price of the product, such that the consumer can end the sign-in action according to the current transaction price or product information provided by the system automatically, and finally allow the consumer to close the transaction and make a payment for the product to be traded. In addition, a network transaction system is also introduced.

11 Claims, 4 Drawing Sheets

METHOD AND SYSTEM FOR NETWORK TRANSACTION

CROSS-REFERENCE TO RELATED APPLICATION

This non-provisional application claims priority under 35 U.S.C. §119(a) on Patent Application No(s). 100115947 filed in Taiwan, R.O.C. on May 6, 2011, the entire contents of which are hereby incorporated by reference.

FIELD OF THE INVENTION

The present invention relates to a method and system for a network transaction, in particular to a method and system provided for a consumer to obtain a product discount through a price change of a product to be traded (such as object and service) made by a user.

BACKGROUND OF THE INVENTION

Traditionally, the transaction mode of network shopping can be mainly divided into three modes, respectively: (1) a network store mode, wherein a consumer buys a merchandise directly according to a price set by a merchant or a network platform, or buys a merchandise with a discount given by the merchandise through a shopping website such as Yahoo Shopping and PCHome, and this mode is also known as a product transaction mode; (2) an auction mode, wherein a merchant or an individual sets a base price of a product, and consumers who want to buy will bid against one another, and finally one or more of the consumer bid and buy the product through an auction website such as Yahoo auction and eBay; and (3) a group buying mode, wherein a group of consumers gather to buy a product in order to obtain a lower price with a discount.

However, when the gathering capability of social networks and websites such as Facebook or Twitter becomes increasingly more powerful, more and more interactions between people can be observed. A better network transaction can be provided if related product transactions can be created through such powerful gathering capability.

Therefore, the present invention provides a method and system for the network transaction to achieve a product transaction totally different from the conventional transaction or novel transaction mode.

SUMMARY OF THE INVENTION

It is a primary objective of the present invention to provide a network transaction method provided for a consumer to perform a sign-in action directly or pushing a post to perform the sign-in action indirectly, so as to achieve the effect of obtaining a discount of a product to be traded.

Another objective of the present invention is to provide an network transaction method, wherein a purchase option is provided to a number of consumers greater than the quantity of a product to be traded, and the consumers compete with one another to buy the product to be traded, and a plurality of users can perform a sign-in action directly or push a post to perform the sign-in action indirectly, so as to obtain a price discount of a product to be traded, as well as obtaining a purchase option after the discount based on the condition that the price of the product to be traded has reached the base price or a consumer decides to close the transaction in the transaction process. The method of the invention is provided to complete the transaction of a product to be traded in a first-to-buy transaction mode.

Another objective of the present invention is to provide a network transaction system for consumers to obtain a discount of the product to be traded through a plurality of users.

Another objective of the present invention is to provide an network transaction system for a plurality of consumers and a plurality of users to complete a transaction of a limited quantity of a product to be traded via the Internet, and the consumers can obtain a discount of the product to be traded through the competition of the consumers for a purchase option of the product to be traded.

To achieve the aforementioned and other objectives, the present invention provides a network transaction system for a plurality of consumers and a plurality of users to perform a transaction of a product to be traded via the Internet, and the network transaction system comprises a exhibition unit, a transaction unit, a sign-in unit, a post-pushing unit, a determination unit and a payment unit. The exhibition unit is provided for exhibiting a product to be traded and generating product information corresponding to the product to be traded, and generating corresponding product information after any one of the consumers has selected the product to be traded corresponding to the product information. The transaction unit is coupled to the exhibition unit and provided for receiving the product information and transmitting the product information to at least one of the users. The sign-in unit is coupled to the transaction unit and provided for generating corresponding check-in information according to a sign-in action of the users. The check-in information is used for changing the product information in the transaction unit. The post-pushing unit is coupled to the sign-in unit. One of the consumers or users can push a post to transmit the product information to another one of the users through the post-pushing unit to generate corresponding check-in information. The determination unit is coupled to the transaction unit and provided for determining the product information and the updated product information to selectively execute an operation of the sign-in unit and the post-pushing unit or generate corresponding transaction information. The payment unit is coupled to the determination unit and provided for closing the transaction of the product to be traded according to the transaction information.

To achieve the aforementioned and other objectives, the present invention provides an network transaction system for a plurality of consumers and a plurality of users to perform a transaction of a limited quantity of a product to be traded via the Internet, and the consumers compete for a purchase option of the product to be traded, wherein the network transaction system comprises a exhibition unit, a transaction unit, a sign-in unit, a post-pushing unit, a determination unit and a payment unit. The exhibition unit is provided for exhibiting the product to be traded and generating product information corresponding to the product to be traded, and provided for the consumers to participate in a competition for a purchase option of the product to be traded according to the product information, wherein the product information include a transaction price, a base price and a closing deadline. The transaction unit is coupled to the exhibition unit and provided for receiving the product information and transmitting the product information to the users. The sign-in unit is coupled to the transaction unit and provided for generating corresponding check-in information according to a sign-in action of the users. The check-in information is used for changing the product information in the transaction unit. The post-pushing unit is coupled to the sign-in unit, and provided for one of the users to push a post through the post-pushing unit to transmit the product information to another one of the users and generating corresponding check-in information. The determination unit is coupled to the transaction unit and provided for determining the product information and the updated product information to selectively execute an operation of the sign-in unit and the post-pushing unit or generating corresponding transaction information. The transaction information is provided for the consumers to obtain the purchase option. The payment unit is coupled to the determination unit and provided for closing the transaction of the product to be traded according to the purchase option.

To achieve the aforementioned and other objectives, the present invention provides a network transaction method for a plurality of consumers and a plurality of users to perform a transaction of a product to be traded via the Internet, and the network transaction method comprises the following steps. Step (a): exhibiting a product information of a product to be traded on an exhibition webpage for one of the consumers to select the product to be traded according to the product information; Step (b): generating a corresponding transaction webpage and a corresponding sign-in webpage according to the selected product to be traded, wherein the transaction webpage includes the product information such as a quantity, a transaction price, a base price, a discount amount, a closing deadline and a payment deadline of the product to be traded, and the sign-in webpage generates check-in information corresponding to the discount amount according to the sign-in action of the users and push a post to change the product information in the transaction webpage; Step (c): determining from the product information whether or not to execute the sign-in action of the sign-in webpage and the post-pushing unit continuously in loops, or generate corresponding transaction information; and Step (d) ending the sign-in of the product to be traded according to the transaction information to close the transaction, such that the consumer selecting the product to be traded can make payment.

To achieve the aforementioned and other objectives, the present invention provides an network transaction system, provided for a plurality of consumers with a number greater than the quantity of products to be traded to compete for a purchase option of the product to be traded, and the plurality of users can perform a sign-in action directly or perform a sign-in action indirectly by pushing a post, such that the consumer can obtain a discount, and the purchase option is given to the consumers selected within a range of the remaining quantity of purchase options according to the remaining quantity of purchase options of the product to be traded, based on the condition of the sequence of the consumer's closing time for the product to be trade or whether the consumer has reached the base price of the product to be traded through the discount amount in advance. The consumers obtaining the purchase option can make payment in order to get the product to be traded.

The foregoing network transaction method comprises the following steps Step (a'): exhibiting product information of a product to be traded on an exhibition webpage, for one of the consumers to compete for a purchase option of the product to be traded according to the product information, and the product to be traded has a fixed quantity; Step (b') determining the consumers participating in the competition according to the remaining quantity of purchase options; Step (c'): generating a corresponding transaction webpage and a corresponding sign-in webpage according to the product to be traded selected by the consumers who participate in the competition, wherein the transaction webpage includes one of the product information such as the quantity, transaction price, base price, discount amount, closing deadline and payment deadline of the product to be traded, and the sign-in webpage generates check-in information including the discount amount corresponding to the product information according to the sign-in action and pushing a post by the users, wherein the check-in information is provided for changing the product information in the transaction webpage; Step (d'): determining (I) whether or not the transaction price of the updated product information has reached the base price, (II) whether or not the transaction time of the product to be traded has reached the closing deadline, and (III) whether or not the consumer has decided to end the transaction and at least one purchase option is remained, so as to decide whether or not to keep executing the sign-in action and the push-a-post action in loops, or generate corresponding transaction information; and, Step (e'): the consumer already obtaining the purchase option further makes payment of the product to be traded according to the transaction information to get the product to be traded.

The method and system for network transaction of the present invention are provided for consumers to perform a transaction of a product to be traded by various types of product transaction modes (such as a must-buy mode or a first-to-buy mode) via the Internet, and through a plurality of users perform a sign-in in the sign-in webpage or push a post in a push-a-post webpage to another user, webpage or forum to perform the sign-in indirectly. A discount is provided to the product to be traded according to the sign-in quantity in the sign-in webpage (including both direct and indirect sign-in actions), such that the transaction price of the product to be traded can be adjusted dynamically.

When the price of the product to be traded has reached the base price or the transaction time has reached the closing deadline, the network transaction system will automatically perform a closing action; or during the process of the consumer performing the transaction of the product to be traded, the consumer can freely perform the closing action according to the product price accepted by the consumer to close the transaction of the product to be traded to get the product to be traded. In addition, the aforementioned transaction mode is also called a must-buy transaction mode.

In another transaction mode, the mode allows a plurality of consumers to compete for a purchase option of the product to be traded, wherein the quantity of consumers is greater than the quantity of the product to be traded. Regardless of the closing action made by individual consumer or automatically by the system, the remaining quantity of purchase options is determined to decide whether or not to keep performing the transaction of the product to be traded, the sign-in action or the push a post in loops. In other words, this transaction mode is provided for a plurality of consumers to compete for a purchase option of the product to be traded, and determine whether or not to close the whole transaction of the product to be trade depending on whether or not there is any purchase option remained. Since this transaction mode is provided for a plurality of consumers to compete for a fixed quantity of purchase options, therefore not all of the consumers can buy the product to be traded, and this transaction mode is also known as a first-to-buy transaction mode.

Compared with the prior art, the transaction mode of the present invention is provided for a consumer to call on a plurality of users on the Internet, and the users can sign-in or push a post to accumulate the discount corresponding to the product to be traded, such that the consumer can satisfy or achieve a product price equal to the base price to get the desired product or service.

DESCRIPTION OF THE PREFERRED EMBODIMENTS

The objects, characteristics and effects of the present invention will become apparent with the detailed description of the preferred embodiments and the illustration of related drawings as follows.

Figure 1:
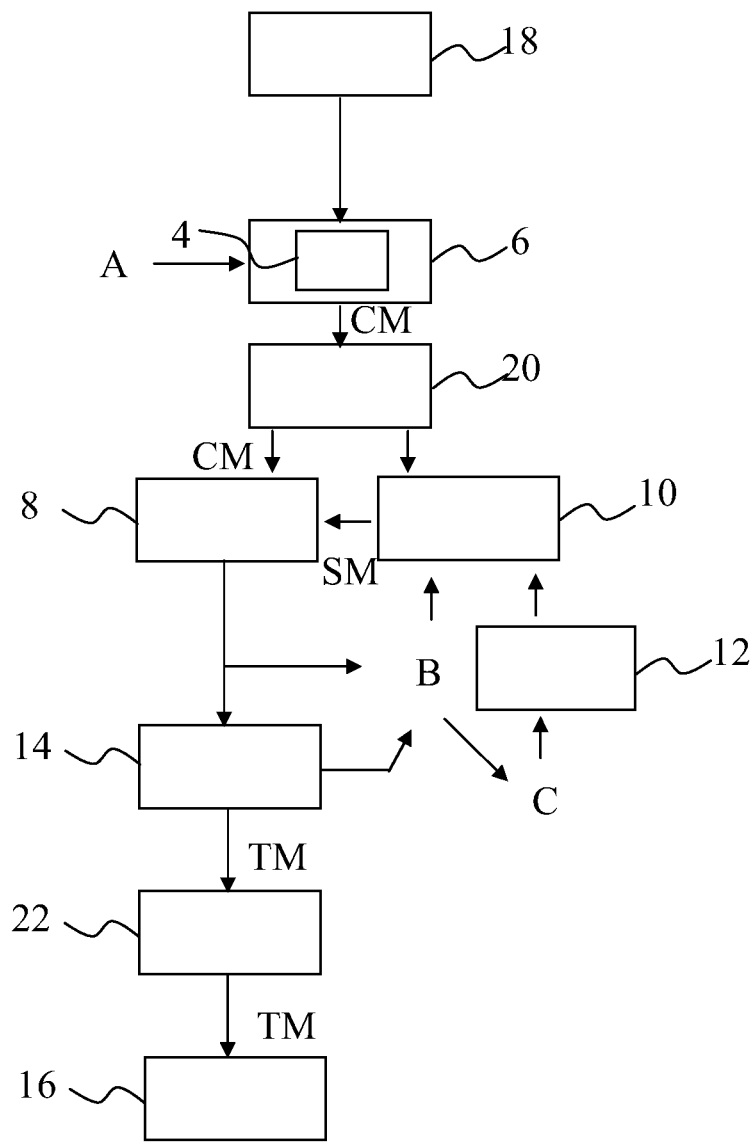
FIG. 1 is a schematic block diagram of a network transaction system in accordance with a first preferred embodiment of the present invention.

With reference to FIG. 1 for a schematic block diagram of a network transaction system in accordance with the first preferred embodiment of the present invention, the network transaction system 2 is illustrated by a consumer A and a plurality of users B, C, and a transaction of a product to be traded 4 via the Internet. Wherein, the product to be traded 4 includes an object or a service.

The network transaction system 2 comprises an exhibition unit 6, a transaction unit 8, a sign-in unit 10, a post-pushing unit 12, a determination unit 14 and a payment unit 16.

The exhibition unit 6 is provided for exhibiting the product to be traded 4, and provided for the consumer A to select the product to be traded 4 and generating corresponding product information CM such as the quantity, transaction price, base price, discount amount, closing deadline and payment deadline of the product to be traded to the transaction unit 8. In the meantime, the exhibition unit 6 generates the corresponding transaction unit 8 and the sign-in unit 10 according to the product information CM.

The transaction unit 8 is coupled to the exhibition unit 6 and provided for receiving the product information CM, such that the consumer A can announce or transmit the product information CM to the users B, C through the transaction unit 8. For example, the consumer A can announce or transmit the product information CM through another user, an e-mail, a forum or a webpage.

The sign-in unit 10 is coupled to the transaction unit 8 and provided for the user B to perform a sign-in action to generate corresponding check-in information SM. Wherein, the check-in information SM is provided as a basis for changing the discount in the product information CM. In one embodiment, the check-in information SM is the item corresponding to the discount amount in the product information CM, such that the discount amount is subtracted from the transaction price in the product information SM for every time after the check-in information SM is received, so as to achieve the effect of using the check-in information SM to update the transaction price. In other words, the check-in information SM changes the transaction price according to the discount amount, and the changed transaction price is the most updated transaction price, which is also a transaction price before another discount is given next time for the product to be traded.

In one embodiment, when the transaction price keeps providing a discount and the final transaction price is lower than the base price, then the transaction price will be set and fixed to the base price instead of the discounted price, not lower than the base price.

The post-pushing unit 12 is coupled to the sign-in unit 10 and provided for the consumer A or the user B to transmit the product information CM to the user C, and the user C can generate corresponding check-in information SM through the sign-in unit 10. Wherein, the post-pushing unit 12 can announce the sign-in unit 10 to a push a post website with publicity function such as a forum on the Internet, a bulletin board service (BBS), a social medium, or an e-mail through the consumer A and the users B, C.

The determination unit 14 is coupled to the transaction unit 8 and provided for performing a transaction of the product to be traded 4 according to the product information CM, and generating corresponding transaction information TM. For example, the determination unit 14 can determine at least one of the closing deadline and the base price, and allow the user B, C to enter into the sign-in unit 10 and the post-pushing unit 12, and use the sign-in unit 10 or the post-pushing unit 12 to execute a direct or indirect sign-in action. In addition, if the determination unit 14 determines that the closing deadline or the base price of the product to be traded has been reached, then the payment unit 16 will be executed. In other words, the determination unit 14 is provided for determining whether or not the closing deadline and the product price of the product to be traded at present have reached the predetermined closing deadline and base price. If the predetermined closing deadline and the base price have not been reached, then the transaction unit 8 will continue its operation provided for users to perform a sign-in or push-a-post action, so as to achieve a cumulative discount of the product to be traded.

The payment unit 16 is coupled to the determination unit 14, and provided for closing the transaction of the product to be traded 4 according to the transaction information TM.

For example, if the closing deadline is reached, then the consumer A can generate corresponding transaction information TM to close the transaction of the product to be traded 4 according to the final updated transaction price, so that the consumer A can use the final transaction price to get the product to be traded, and the transaction price (which is also called the consumer's satisfied price) is lower than the original predetermined product price of the product to be traded or the consumer A can even use the base price to get the product to be traded.

The network transaction system 2 further comprises a setup unit 18 and a webpage unit 20. The setup unit 18 presets the quantity, the transaction price, the base price, the discount amount, the closing deadline and the payment deadline of a product to be traded before the product to be traded 4 is placed on shelf to be sold. The webpage unit 20 generates the corresponding transaction unit 8, sign-in unit 10 and post-pushing unit 12 according to the product information CM in the exhibition unit 6.

In one embodiment, the consumer A selecting the product to be traded can close the transaction of the product to be traded or the network transaction system 2 can close the transaction automatically according to the condition whether or not the closing deadline or the base price has been reached. The consumer A can close the transaction of the product to be traded anytime during the transaction process according to the updated transaction price of the product to be traded and directly perform a closing payment, and the consumer A can determine the price of the product to be traded, and such price is called the consumer's satisfied price. It is noteworthy to point out that the updated transaction price of the product to be traded is not lower than a predetermined base price of the product to be traded in one embodiment.

Figure 2:
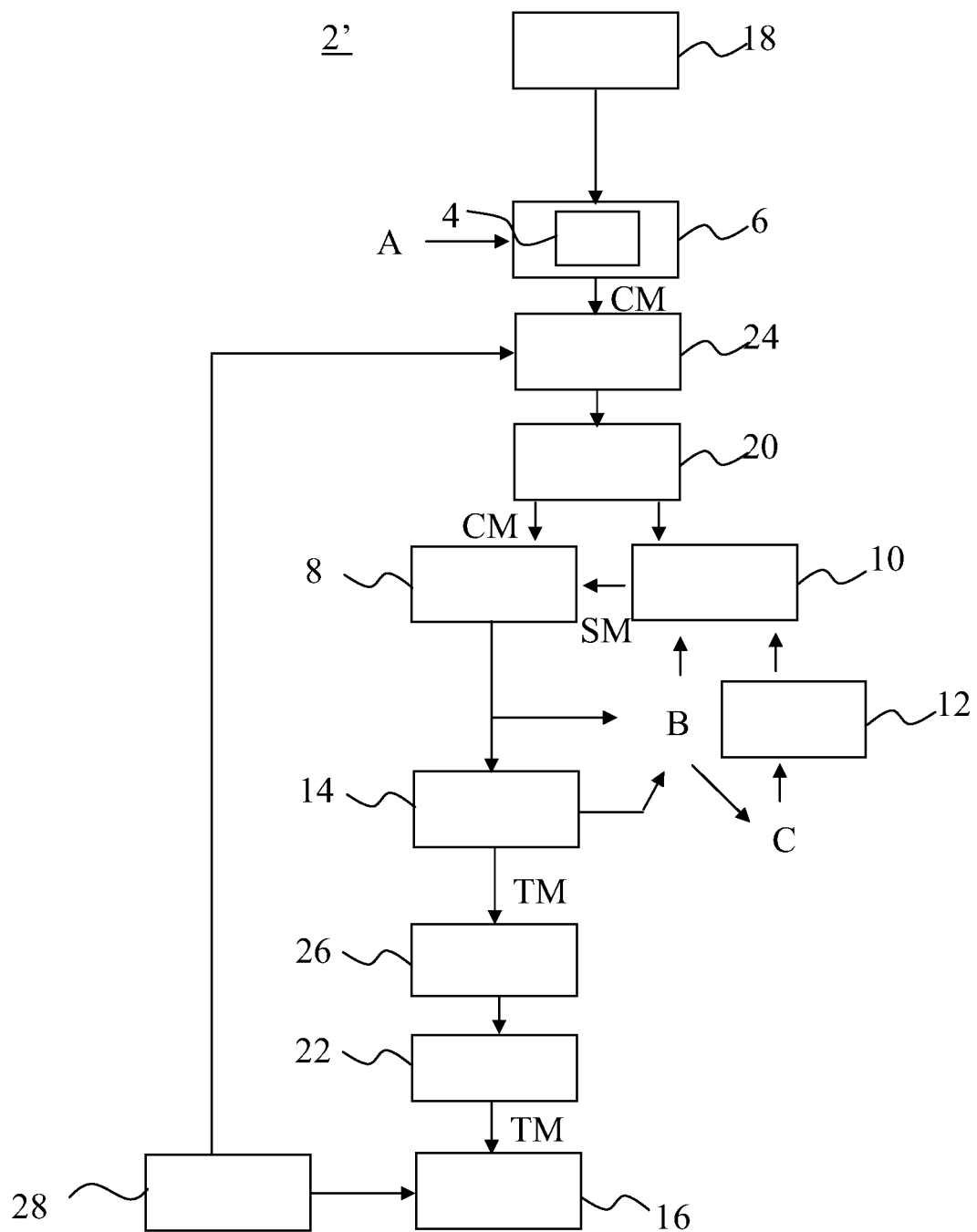
FIG. 2 is a schematic block diagram of a network transaction system in accordance with a second preferred embodiment of the present invention.

With reference to FIG. 2 for a schematic block diagram of an network transaction system in accordance with the second preferred embodiment of the present invention, the network transaction system 2' is similarly provided for a consumer A and a plurality of users B, C to perform a transaction of a limited quantity of a product to be traded 4 via the Internet. wherein, the network transaction system 2' not only comprises the exhibition unit 6, the transaction unit 8, the sign-in unit 10, the post-pushing unit 12, the determination unit 14, the payment unit 16, the setup unit 18 and the generating unit 20, but also comprises a first compare unit 22, a second compare unit 24 and a third compare unit 26.

The difference of this embodiment from the previous one resides on that the quantity of the products to be traded 4 is a limited quantity. To timely reflect the actual quantity of the product available during the transaction of the product to be traded, the network transaction system 2' of this preferred embodiment further includes a mechanism of the purchase option, such that a consumer with the purchase option can make payment to assure the purchase of the product to be traded. At an early stage, the purchase option corresponds to the quantity of the product to be traded. In other words, the quantity of the product is equal to the quantity of purchase options. Wherein, the difference between the quantity of products and the quantity of purchase options is that the quantity of purchase options decreases with the quantity of purchase options obtained by the consumers, and the quantity of the product to be traded will be decreased only if the consumer has actually made the payment. In other words, the consumer obtaining the purchase option has not obtained the product to be traded yet, until the consumer has actually made the payment to buy the product to be traded. If the consumer with the purchase option has not complete the final payment action, then the purchase option will be released and provided for other consumers to perform the transaction of the product to be traded.

The setting unit 18 presets one of the quantity, the transaction price, the base price, the discount amount, the closing deadline and the payment deadline of the product to be traded 4 before the product to be traded is put on shelf for sale.

The exhibition unit 6 is provided for displaying a limited quantity of a product to be traded 4. In addition, the network transaction system 2' allows a number of consumers greater than the limited quantity of a product to be traded 4 to compete for the limited quantity of purchase options. For example, one of the consumers (consumer A) can participate in the competition for the purchase option of the product to be traded 4 through the exhibition unit 6 and generate corresponding product information CM to the transaction unit 8 after the consumer A has competed and obtained the purchase option. Wherein, the product information CM includes the quantity, the transaction price, the base price, the discount amount, the closing deadline and the payment deadline.

In addition, whether or not the consumer A can obtain the purchase option of the product to be traded mainly depends on the following two methods. In the first method, if the consumer A decides to close the transaction of the product to be traded at the current transaction price, then the consumer A can obtain the purchase option. In the second method, the consumer A cannot decide when to end the transaction of the product to be traded, but the consumer A can end the transaction of the product to be traded automatically by the network transaction system 2', wherein the condition of ending the transaction automatically depends on whether or not the transaction time of the product to be traded has reached the closing deadline, or whether or not the transaction price of the product to be traded has reached the base price. Regardless of which method of obtaining the purchase option, if the consumer A obtains the purchase option for sure, then the total quantity of the purchase options will be decremented by one.

The network transaction system 2' further comprises a second compare unit 24 is configured between the exhibition unit 6 and the webpage unit 20. The second compare unit 24 compares whether or not there is any purchase option remained. Wherein, the remaining quantity of the purchase options is equal to the total number of purchase options minus the number of purchase options obtained by the consumers who have made payment for the transaction of the product to be traded. If no purchase option is remained, then new consumers waiting to participate in the competition will be unable to execute the webpage unit 20. In other words, the new consumer cannot have a chance to obtain the purchase option or participate in the competition for the product to be traded. On the other hand, if there is a purchase option remained, the new consumer waiting to participate in the competition can execute the webpage unit 20 and have a chance of obtaining the purchase option according to the aforementioned method.

The transaction unit 8, the sign-in unit 10, post-pushing unit 12 and the determination unit 14' of this preferred embodiment are substantially the same as those of the first preferred embodiment. For example, the determination unit 14' can determine the base price, and is provided for the consumer A obtaining the product to be traded to selectively execute one of the sign-in unit 10, the post-pushing unit 12, the third compare unit 26 and the payment unit 16.

The network transaction system 2' further comprises a third compare unit 26 is configured between the transaction unit 8 and the payment unit 16. The third compare unit 26 determines whether or not the consumer A can obtain the purchase option of the product to be traded 4. If there is a purchase option of the product to be traded remained, then the consumer A obtaining a purchase option can execute the payment unit 16. On the other hand, if there is no purchase option of the product to be traded remained, then the consumer A cannot obtain the purchase option or directly close the transaction of the product to be traded.

In addition, the network transaction system 2' further comprises a counter 28 is configured between the determination unit 14 and the second compare unit 24 for counting the total of consumers obtaining the purchase option and completing the payment for the transaction, and changing the total number of the purchase options according to the total. In other words, the counter 28 is provided for determining the number of remained purchase options.

The method of determining whether the consumer A can obtain the purchase option of the product to be traded is described as follows:

If the transaction of the product to be traded is closed by using the base price of the product 4 as a closing condition, then the transaction unit 8 will enter into the closing action and assign the purchase option only if the transaction price is equal to the base price.

If the transaction of the product to be traded 4 is closed by using the closing deadline as a determination condition, then the first compare unit 22 installed between the determination unit 14 and the payment unit 16 is used for comparing the consumer A with other consumers with regard to the quantity of the product to be traded 4 in the check-in information SM and sorting the check-in information SM by quantity according to the total quantity of the product to be traded 4 obtained by the consumers in the check-in information SM in order to close the transaction automatically by the consumer according to the sorted order of the consumers within the quantity of the remaining purchase options, and transmitting of the corresponding transaction information TM of the consumer to the payment unit 16. In other words, the quantity of the check-in information SM provides a sorted list to a consumer who wants to buy the product to be traded 4, so that when the consumer wants to close the transaction, the consumer can determine which consumers can actually obtain the purchase option of the product to be traded 4 according to the sorted list and the remaining quantity of purchase options of the product to be traded, and then execute the payment unit 16 according to the obtained purchase option.

Figure 3:
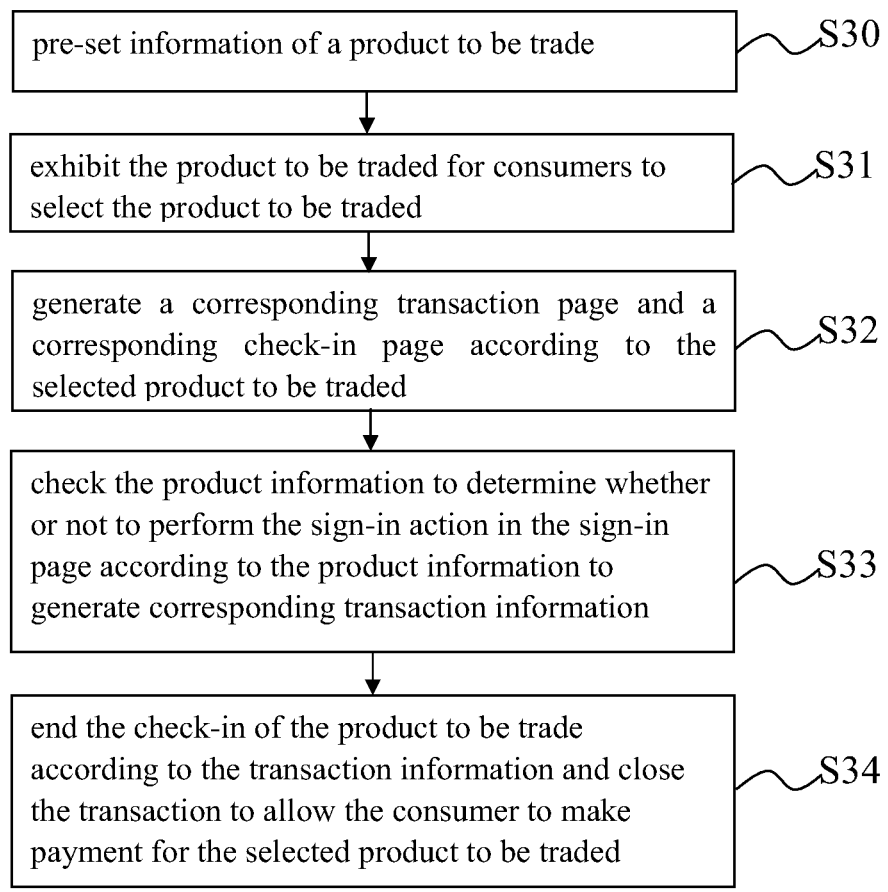
FIG. 3 is a flow chart of a network transaction method in accordance with the first preferred embodiment of the present invention.

With reference to FIG. 3 for a flow chart of an network transaction method in accordance with the first preferred embodiment of the present invention, the network transaction method is provided for a plurality of consumers and a plurality of users to perform a transaction of a product to be traded via the Internet (which is called a must-buy mode), and the network transaction method comprises the following steps:

In Step S31, product information of a product to be traded is exhibited on an exhibition webpage and provided for one of the consumers to select the product to be traded according to the product information.

In Step S32, a corresponding transaction webpage and a corresponding sign-in webpage are generated according to the selected product to be traded, wherein the transaction webpage includes at least one of the product information such as the quantity, transaction price, base price, discount amount, closing deadline and payment deadline of the product to be traded, and the sign-in webpage generates check-in information corresponding to a discount amount according to a sign-in action of the users. Wherein, the check-in information is provided for changing the product information in the transaction webpage. The sign-in webpage is provided for the users to execute the sign-in action to generate the corresponding check-in information, and the consumers and the users can announce or transmit the sign-in webpage to other users by pushing a post.

In other words, the transaction price of the product to be traded will be affected by the check-in information and changed dynamically. In one embodiment, the updated transaction price is equal to the transaction price before the update takes place minus the discount amount. If the transaction price of the product to be traded is lower than the base price of the product to be traded, then the updated transaction price of the product to be traded is equal to the base price of the product to be traded.

In another embodiment, the consumer who wants to buy the product to be traded can see the price of the trading product, and a website with the sign-in webpage is provided for the consumer or the user who has received messages transmitted from the consumer to send e-mail to other users or directly duplicate and post the website to a forum, or push a post through a social website such as Plurk or Facebook to push the website to an account number of the product to be traded for corresponding users, so as to achieve the effect of announcing the sign-in webpage by pushing a post. In addition, if a user receives an e-mail with the sign-in webpage website, the user can forward the e-mail to other users to attract more users to log on the sign-in webpage of the consumer to expedite the discount.

In Step S33, this step determines whether or not to perform the sign-in action in the sign-in webpage according to the product information to generate corresponding transaction information. Wherein the closing deadline and the base price of the product to be traded in the product information can be used for determining whether the sign-in webpage of the consumer continues providing other users to sign in directly or push a post to sign-in indirectly in loops. It is noteworthy to point out that the consumer can freely and actively end the sign-in action and the push-a-post action of the product to be traded to close the transaction directly before reaching the conditions of the transaction price, the base price and the product closing deadline.

In Step S34, the sign-in of the product to be traded is ended to close the transaction according to the transaction information to allow the consumer to make payment for the selected product to be traded.

In addition, before Step 31 takes place, the network transaction method further comprises a step S30 of presetting product information such as the quantity, the transaction price, the base price, the discount amount, the closing deadline and the payment deadline in the setting webpage.

Figure 4:
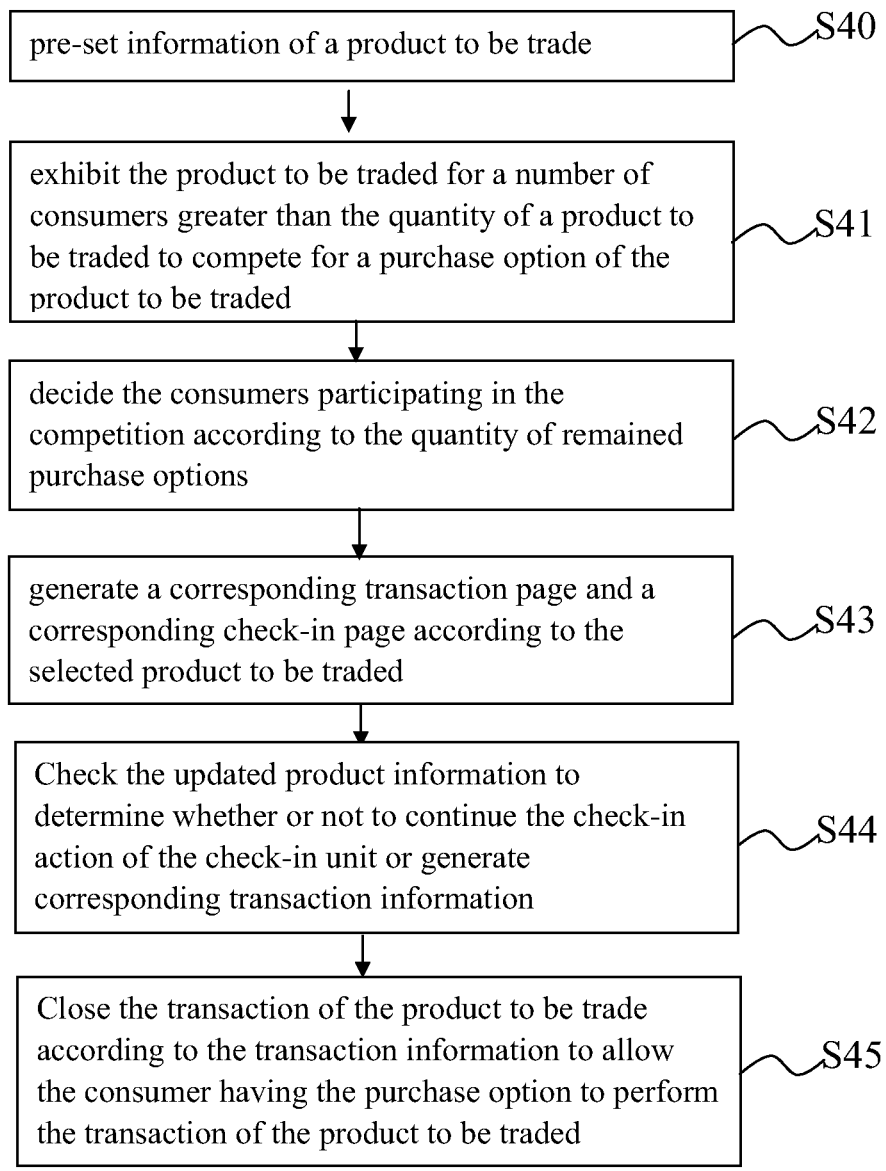
FIG. 4 is a flow chart of a network transaction method in accordance with the second preferred embodiment of the present invention.

With reference to FIG. 4 for a flow chart of an network transaction method in accordance with the second preferred embodiment of the present invention, the network transaction method is provided for a plurality of consumers and a plurality of users to perform a transaction of a limited quantity of a product to be traded via the Internet (which is called a first-to-buy mode), and the network transaction method comprises the following steps:

In Step S41, product information of a product to be traded is exhibited on an exhibition webpage and provided for one of the consumers with a quantity greater than the quantity of the products to compete for a purchase option of the product to be traded according to the product information. Wherein, the transaction information includes the quantity, transaction price, base price, discount amount, closing deadline and payment deadline of the product to be traded.

In Step S42, the consumer who participates in the competition is determined according to the remaining quantity of purchase options. In one embodiment, the total of the quantity of purchase options and the quantity of consumers who make a payment to close the transaction is counted to change the total number of the purchase option. If the total number of purchase options is still greater than zero, then the consumers can execute the corresponding transaction webpage and sign-in webpage.

In Step S43, the corresponding transaction webpage and sign-in webpage are generated according to the selected product to be traded. Wherein, the transaction webpage includes of the information of the product to be traded such as the quantity, transaction price, base price, discount amount, closing deadline and payment deadline. In the sign-in webpage, check-in information corresponding to the discount amount is generated according to the sign-in action of the users, and the check-in information is provided for changing the product information in the transaction webpage. Wherein, the sign-in webpage is provided for the users to execute the sign-in action to generate the corresponding check-in information, and the consumer and any one of the users can announce the sign-in webpage to other users by pushing a post.

In Step S44, this step determines whether or not the updated transaction price in the product information has reached the base price, whether or not the transaction time of the product to be traded has reached the closing deadline, whether or not the consumer decides to close the transaction, whether or not there is any purchase option remained, so as to decide whether or not to continue the sign-in action of the sign-in unit and generate corresponding transaction information.

In Step S45, the transaction of product to be traded is closed according to the transaction information, such that the consumer who obtains the purchase option can perform the transaction of the product to be traded.

In addition, the network transaction method further comprises a step S40 before Step S41 takes place. In Step 40, at least one of the quantity, the transaction price, the base price, the discount amount, the closing deadline and the payment deadline is set in the setting webpage.

Wherein, the first-to-buy mode can be subdivided into the following three modes:

In Mode 1, the closing deadline has not been set in Step S40 yet, and there is still a purchase option available in Step S44, such that the consumers still compete for the purchase option, and the consumer can close the transaction anytime to obtain the purchase option at the current transaction price. In other words, the consumer can obtain the purchase option and make the payment to close the transaction by the base price or a price higher than the base price, provided that there is still a purchase option while the competition is taking place.

In Mode 2, the closing deadline is set in Step S40, and the consumer cannot freely close the transaction in Step S44, but the consumer has to wait till the transaction price has reached the base price before the system can close the transaction in advance, so that the consumer can obtain the purchase option and make the payment to close the transaction, or the time has reached the closing deadline, such that the competition for the purchase option will end, and a sorted list of the quantity of the check-in information will be provided for deciding whether or not the consumer who selects the trading product to make payment and close the transaction. In other words, if the time of the current transaction has reached a predetermined closing deadline, then all sign-in actions and push-a-post actions will be stopped, and corresponding transaction information will be generated. If the number of signed-in consumers having the transaction information is equal to or smaller than the remaining quantity of purchase options, then the consumer can obtain the purchase option and make payment to get the product to be traded.

In Mode 3, the closing deadline has not been set in Step S40 yet, and the consumer cannot freely close the transaction in Step S44, but has to wait till the transaction price reaches the base price before the system can close the transaction and allow the consumer to obtain the purchase option of the product and make payment to close the transaction. If no purchase option is remained, and the consumer with the purchase option has made payment to close the transaction, the competition of the purchase option of the product will end.

The method and system for network transaction of the present invention are provided for a consumer to use a plurality of product transaction modes (such as the must-buy or first-to-buy mode) to perform a sign-in or push a post of the sign-in webpage to another user, webpage or forum on a corresponding sign-in webpage of a product to be traded through a plurality of users, such that the price of the product to be traded can be changed dynamically according to the product discount provided on the sign-in webpage according to the number of sign-in consumers. If the price of the product to be traded has reached a base price or a user has accepted a price, then the purchase of the product to be traded will end. This transaction mode is called a must-buy mode. If the quantity of the product to be traded is a limited quantity, the condition of remaining quantity of purchase options is used for further determining whether to perform a transaction, sign-in and push-a-post action of the product to be traded and allow a consumer to buy the product to be traded. This transaction mode is called a first-to-buy mode.

Compared with the prior art, the transaction mode of the present invention is provided for consumers to call upon users on the Internet, such that the consumer can buy a product or a service at a lower price such as a base price or a price close to the base price through the discount accumulated by the users.

While the invention has been described by means of specific embodiments, numerous modifications and variations could be made thereto by those skilled in the art without departing from the scope and spirit of the invention set forth in the claims.

What is claimed is:

1. A network transaction method, provided for a plurality of consumers and a plurality of users to perform a transaction of a product to be traded via the Internet connected to a server, the network transaction method being operable in the server, and the network transaction method comprising the steps of:

exhibiting product information of the product to be traded in an exhibition webpage provided for any one of the consumers to compete for a purchase option of the product to be traded according to the product information, and the product to be traded having a fixed quantity;

generating a corresponding transaction webpage and a corresponding sign-in webpage according to the selected product to be traded, wherein the transaction webpage contains at least one of the product information including a quantity, a transaction price, a base price, a discount amount, a closing deadline and a payment deadline of the product to be traded, and the sign-in webpage generates check-in information corresponding to a discount amount according to sign-in actions and post-pushing actions of users to update the product information in the transaction webpage;

checking the product information to determine whether to execute the sign-in actions in the sign-in webpage and the post-pushing actions in loops, or generate corresponding transaction information; and ending the sign-in actions of the product to be traded according to the transaction information to close the transaction and allow the consumer selecting the product to be traded to make a payment.

2. The network transaction method of claim 1, further comprising the step of setting one of the quantities, the transaction price, the base price, the discount amount, the closing deadline and the payment deadline of the product information in a setting webpage.

3. The network transaction method of claim 2, wherein the sign-in webpage is provided for the users to execute the sign-in actions to generate the corresponding check-in information, and one of the consumers and any one of the users to announce the sign-in webpage to other users by pushing a post.

4. The network transaction system of claim 3, wherein at least one of the closing deadline and the base price in the product information is checked to determine whether the user should take at least one of the sign-in actions and the post-pushing actions.

5. The network transaction method of claim 3, wherein the consumer actively decides to end the sign-in and post-pushing action of the product to be traded to close the transaction.

6. A network transaction method, provided for a plurality of consumers and a plurality of users to perform a transaction of a limited quantity of a product to be traded via the Internet connected to a server, the consumers competing for a purchase option of the product to be traded, the network transaction method being operable in the server, and the network transaction method comprising the steps of:

exhibiting product information of the product to be traded in an exhibition webpage provided for any one of the consumers to compete for the purchase option of the product to be traded according to the product information, and the product to be traded having a fixed quantity;

determining a consumer who participates in the competition according to the quantity of remaining purchase options;

generating a corresponding transaction webpage and a corresponding sign-in webpage according to the product to be traded selected by the competing consumers, wherein the transaction webpage includes at least one of the product information selected from a quantity, a transaction price, a base price, a discount amount, a closing deadline and a payment deadline of the product to be traded, wherein the sign-in webpage generates check-in information of a discount amount in the corresponding product information according to sign-in actions and post-pushing actions of users, and the check-in information is provided for updating the product information in the transaction webpage;

determining at least one of the situations whether the updated transaction price in the product information has reached the base price, the transaction time of the product to be traded has reached the closing deadline, the consumer has decided to close the transaction, and there is a remaining option quantity, so as to decide whether to continue executing the sign-in actions and the post-pushing actions in loops or generate corresponding transaction information; and performing a payment for the product to be traded according to the transaction information by the consumer having the purchase option, so as to obtain the product to be traded.

7. The network transaction method of claim 6, further comprising the step of setting at least one of the quantity, the transaction price, the base price, the discount amount, the closing deadline and the payment deadline in a setting webpage.

8. The network transaction method of claim 6, wherein the sign-in webpage is provided for the users to execute the sign-in actions to generate the corresponding check-in information, and any one of the consumers or any one of the users can announce the sign-in webpage to other users by pushing a post.

9. The network transaction method of claim 8, further comprising the steps of: comparing the numbers of the consumers selecting the product to be traded with the number of other consumers corresponding to the check-in information of the product to be traded; and determining whether or not to transmit the transaction information of one of the consumers of the product to be traded to the payment unit to make a payment according to a rank of the quantities of the check-in information.

10. The network transaction method of claim 8, further comprising the step of determining whether there is a purchase option remaining to allow the consumer to decide whether to execute the transaction webpage and the sign-in webpage.

11. The network transaction method of claim 10, further comprising the step of counting the total number of consumers who have obtained the purchase option and perform the payment to close the transaction to decrease the total number of the purchase options, and when the total number of the purchase options is still greater than zero, the consumers execute the corresponding transaction webpage and the sign-in webpage.

* * * * *